United States Patent [19]

Dogliotti

[11] 4,164,645

[45] Aug. 14, 1979

[54] DEVICE FOR HEATING LIQUIDS CONTAINED IN SEALED PLASTICS CONTAINERS

[75] Inventor: Amilcare Dogliotti, Alba, Italy

[73] Assignee: P. Ferrero C. S.p.A., Alba Italy

[21] Appl. No.: 869,964

[22] Filed: Jan. 16, 1978

[30] Foreign Application Priority Data

Oct. 14, 1977 [IT] Italy ............................. 69296 A/77

[51] Int. Cl.² ................................................. H05B 3/68
[52] U.S. Cl. ................................... 219/452; 219/432; 219/434; 219/435; 219/441; 219/456; 219/449; 219/518; 219/530
[58] Field of Search ............... 219/444, 448, 449, 450, 219/451, 452, 453, 456, 518, 519, 430, 432, 433, 434, 435, 439, 441, 530, 462, 214

[56] References Cited

U.S. PATENT DOCUMENTS

| | | | |
|---|---|---|---|
| 2,520,788 | 8/1950 | Wales | 219/441 |
| 2,994,758 | 8/1961 | Kelly | 219/452 X |
| 3,059,085 | 10/1962 | Bletz | 219/452 |
| 3,328,561 | 6/1967 | Sakamoto et al. | 219/450 X |
| 3,384,735 | 5/1968 | Linger | 219/456 |
| 3,384,736 | 5/1968 | Nowosielski | 219/456 |
| 3,440,406 | 4/1969 | Sego, Jr. | 219/444 |
| 3,586,824 | 6/1971 | Barney | 219/452 |
| 3,760,149 | 9/1973 | Harsanyi | 219/518 X |
| 3,909,592 | 9/1975 | Eide | 219/462 |
| 4,070,670 | 1/1978 | Chen | 219/452 X |

*Primary Examiner*—Volodymyr Y. Mayewsky
*Attorney, Agent, or Firm*—Sughrue, Rothwell, Mion, Zinn and Macpeak

[57] ABSTRACT

A device for heating a drink in a thermoplastics container sealed by a metal cover, in which the container is placed in a support upside-down and depressed to bring its cover into contact with an electrical heater, the depression of the container support operating a microswitch which energizes the heater and a support-retaining electromagnet to heat the container for a timed interval. The resistance of the heater is measured during heating by a Wheatstone bridge and utilized to regulate the temperature reached by the heater.

15 Claims, 6 Drawing Figures

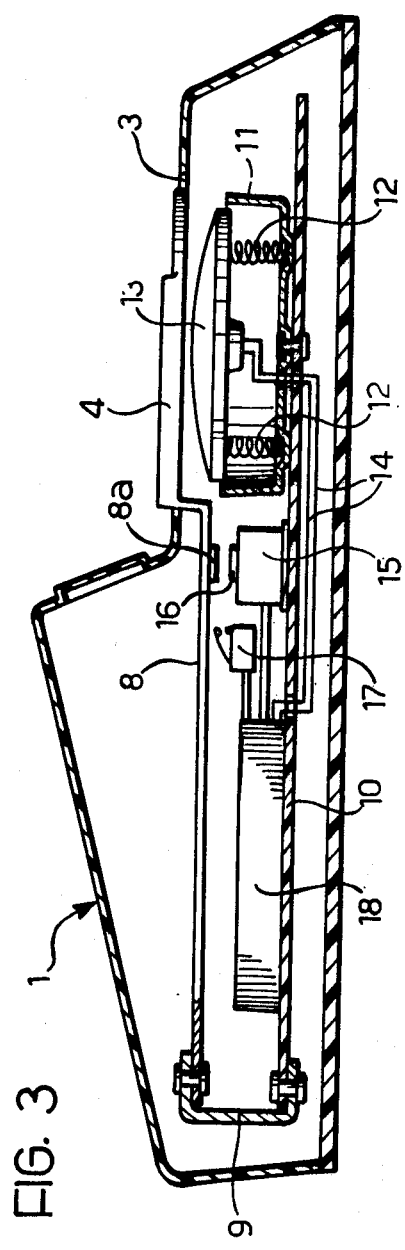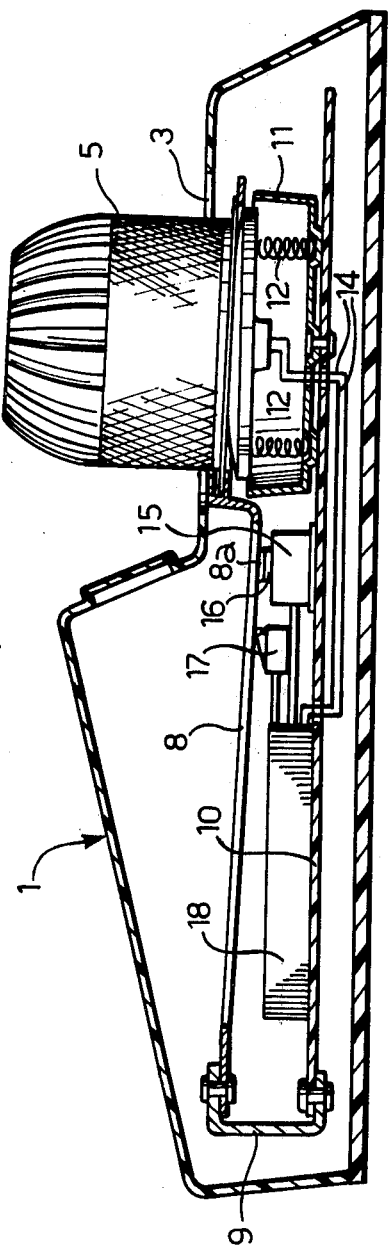

DEVICE FOR HEATING LIQUIDS CONTAINED IN SEALED PLASTICS CONTAINERS

The present invention relates to a device for heating a liquid such as a drink contained in a sealed plastics container.

More particularly, the invention is applicable to the heating of a liquid in a container of thermoplastics material having a metal cover sealed thereon, for example, by welding.

The main object of the invention is to provide a device as aforesaid for use under conditions of urgency, such as occur at refreshment points for a clientele in transit or otherwise in a hurry—for example at railway stations or in places of entertainment or at work places—where it is necessary to be able to heat a liquid drink in a very short time (typically less than 50 seconds) to the optimum temperature for consumption (typically of the order of 50° C.), without damaging the plastics material of the container.

A further object of the invention is to provide a device for heating liquids having as aforesaid in which the heating is effected by means of an electrical resistance heater the temperature of which is controlled by simple and economic means.

According to the present invention there is provided a device for heating a liquid contained in a container of thermoplastics material hermetically sealed by means of a metal cover, characterised in that the device comprises in combination:

support means for the container, designed to accommodate the container in an inverted position;

a resistive heater positioned in relation to the support means so that during the entire heating of the liquid the heater is in thermal contact substantially with the whole surface of the metal cover of the inverted container; the said heater being of nominal power sufficient to heat the liquid in a short time while having the electrothermal characteristics of a positive temperature coefficient resistance;

support means for the heater adapted to keep the heater in contact with the cover of the container accommodated in the support means during the period of the heating of the liquid, and an electronic control unit connected to a power supply through a general switch, the control unit comprising:

(a) a Wheatstone bridge fed by means of current supply leads connected to input terminals of the electronic control unit, the resistance heater being included in an arm of said Wheatstone bridge which provides on a measuring diagonal a signal indicative of the temperature reached by the resistance of said heater, (b) a regulator circuit arranged to regulate the current supply to the said Wheatstone bridge in dependence upon the said signal on the measuring diagonal of the bridge so that, after an initial transient phase, the temperature of the heater remains substantially within a predetermined range for the whole duration of the heating of the liquid, and (c) a timer arranged, after a predetermined interval timed from the moment of commencement of the heating, to switch off, by means of the regulator circuit, the current supply to the Wheatstone bridge and to open the general switch, disconnecting the control unit from the power supply.

The present invention affords a simple device for the rapid but controlled heating of liquid in a sealed plastics container, without damaging the container.

The invention will now be described, by way of non-limiting example, with reference to the accompanying drawings, in which:

FIG. 3 is a longitudinal cross-section taken along the line III—III of FIG. 1 illustrating the device in its rest condition;

FIG. 4 is a longitudinal section similar to that of FIG. 3, illustrating the device in its heating condition;

Figure 1:
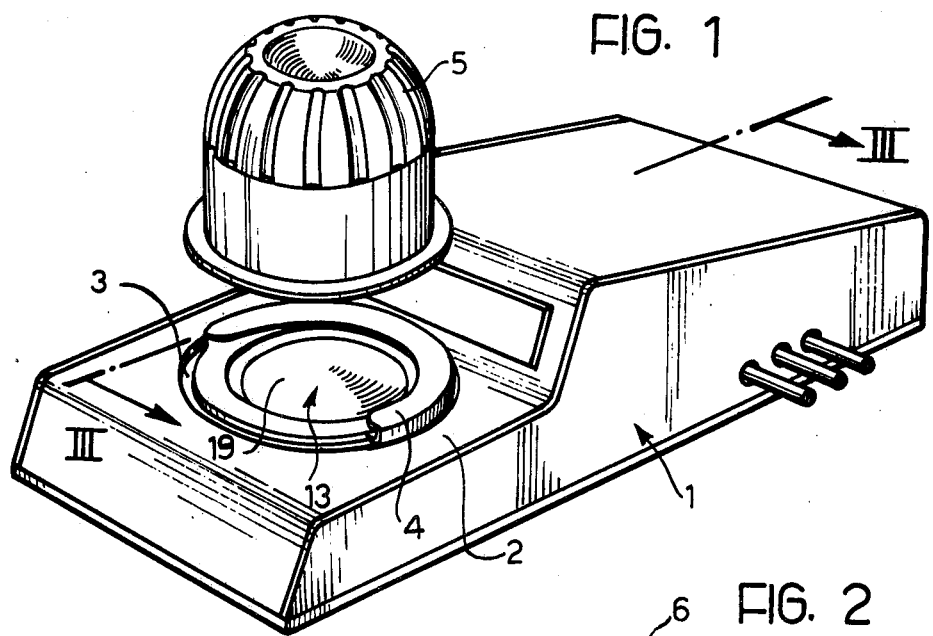
FIG. 1 is a diagrammatic perspective view of a device for heating drinks according to one embodiment of the invention.
Figure 2:
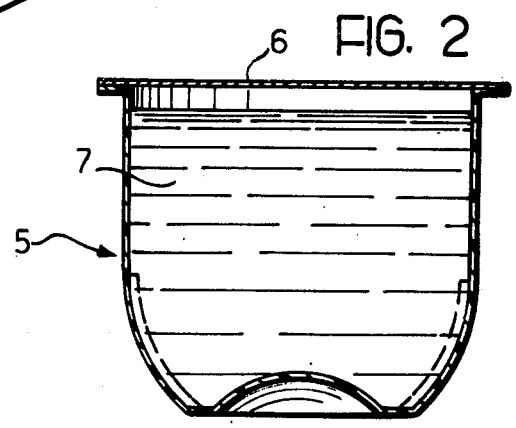
FIG. 2 is an axial section of a container for drinks to be heated by the device shown in FIG. 1.

Referring first to FIG. 1, the device according to the invention has a housing 1. A flat surface 2 of the housing 1 is provided with an opening 3 adapted to accommodate, in a C-shaped or forked support 4, a cup-like container 5 for a liquid, in this case a drink 7. The container 5, shown in FIG. 2, is of thermoplastics material and is sealed hermetically by a metal cover 6. The container 5 has to be accommodated in the support 4 in an inverted position, so that the drink 7 contained in it remains in contact with the metal cover 6 throughout the time it is being heated.

The support 4 constitutes one end of a lever 8, the opposite end of which is fixed to a bracket 9 attached rigidly to a support plate 10 made of plastics material known under the Trade Name "vetronite". The bracket 9 keeps the C-shaped support 4 in a substantially horizontal position in the rest condition of the device.

The support plate 10 carries a printed circuit and is fixed to the housing 1. The plate 10 supports a cup-shaped container 11, made of metal, in which there are housed three springs 12 supporting an electrical resistive heater 13. The heater 13 is located below the C-shaped support 4 and is supplied with current through a pair of leads 14.

An electromagnet 15 is also supported by the plate 10 and is arranged so that its polepieces 16 can act on two arms 8a extending transversely from the body of the lever 8. A general microswitch 17, normally open, is interposed between power supply leads (not shown) and an electronic control unit 18 arranged to control the current supply to the resistive heater 13 and the energisation of the electromagnet 15.

Under conditions of use of the device, the lever 8 is kept in the horizontal rest position by the bracket 9.

When downward pressure is exerted upon an inverted container 5 located in the C-shaped support 4 (FIG. 2) so as to overcome the elastic resistance of the bracket 9, the support 4 is depressed slightly, bringing the cover 6 of the container 5 into contact with the heater 13.

The heater 13, of the fully clad type, is shaped like a plano-convex lens with its convex face 19 uppermost. The springs 12 urge the heater 13 into firm contact with the whole surface of the cover 6, accommodating any distortion of the cover which may result from its heating.

Figure 5:
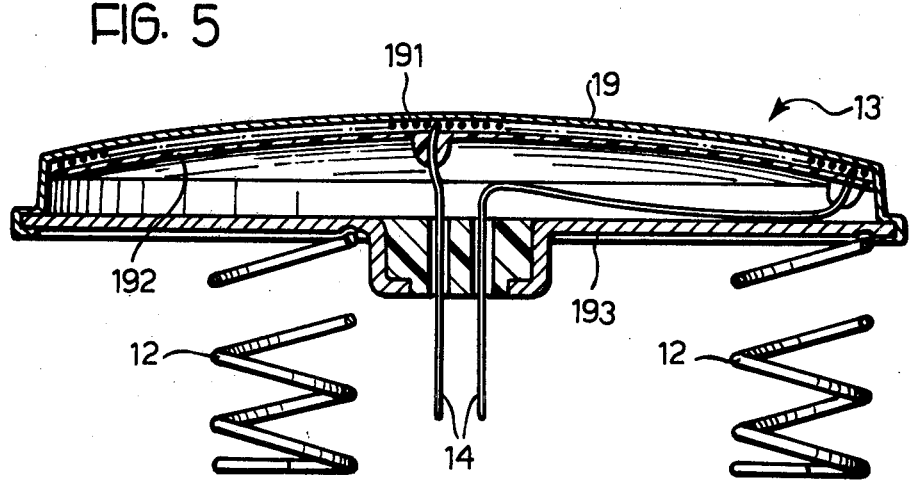
FIG. 5 is a cross section of one detail of FIGS. 3 and 4, on an enlarged scale.

The convex upper face 19 of the heater 13 is of metal (FIG. 5) and acts as a heating surface, being disposed in thermal contact with a heating element 191 of nickel wire (FIG. 3).

The said heating element 191 is wound spirally on an insulating support 192 and is embedded in vitreous resin, being supplied with current through the leads 14, which emerge from the flat lower face 193 of the heater 13.

When the container 5 is depressed into the heating position illustrated in FIG. 4, the lever 8 closes the microswitch 17, connecting the power supply to the electronic control unit 18, which supplies current to the resistive heater 13 and energising current to the electromagnet 15.

Upon being energised the electromagnet 15 acts upon the arms 8a of the lever 8, keeping the lever in the depressed position until the electromagnet is de-energised by the control circuit 18 at the end of the heating period. When the electromagnet is de-energised the lever 8 returns to its original rest position, allowing the microswitch 17 to reopen to disconnect the power supply from the control unit 18, which then cuts off the current supply to the heater 13.

Figure 6:
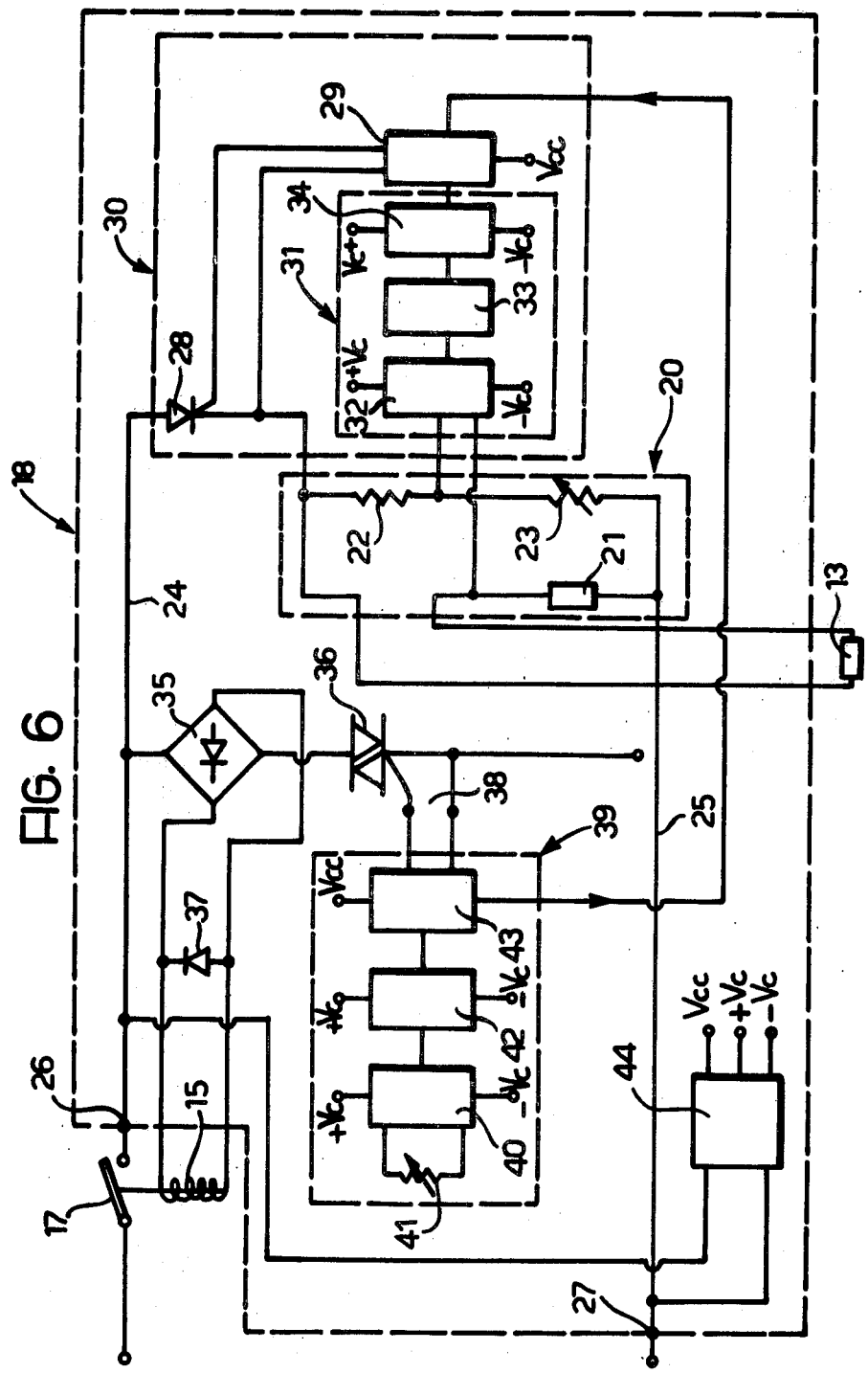
FIG. 6 is a partly schematic block diagram of the electric circuit of the device shown in FIG. 1.

FIG. 6 illustrates schematically a circuit of the control unit 18. The unit 18 includes a Wheatstone bridge 20 one arm of which includes the resistive heater 13 which is balanced against a second arm including a shunt resistor 21 connected in series with the heater 13, the bridge 20 having two ratio arms containing a fixed resistance 22 and a variable resistance 23 respectively.

A pair of power supply leads 24, 25, connected respectively to input terminals 26, 27, of the control unit 18, are connected to the Wheatstone bridge 20 through a thyristor (or SCR) 28, which forms part of a current regulating circuit 30, indicated within a broken outline. The regulating circuit includes a first pilot circuit 29 consisting of a unijunction transistor (UJT) acting as a pulse generator.

The measuring diagonal of the Wheatstone bridge 20 includes a control circuit 31, also forming part of the regulating circuit 30. The control circuit 31 consists of a differential amplifier 32 the output of which is passed to an integrator circuit 33 which is connected to a first threshold comparator 34. The output of the first threshold comparator 34 is connected to the first pilot circuit 29 which controls the striking of the thyristor 28.

The normally open microswitch 17 cuts off the power supply to the control unit 18 in the rest condition of the device.

A rectifier bridge 35 is connected through a TRIAC 36 to the power supply leads 24, 25, and has its rectifying diagonal connected to the electromagnet 15, which is connected in parallel with a stabilizer diode 37. The trigger electrodes 38 of the TRIAC 36 are connected to a timer circuit 39, shown within a broken outline including a ramp voltage generator 40 regulatable by means of a variable resistance 41. The output of the ramp voltage generator 40 is connected to a second threshold comparator 42 the output of which is connected to a second pilot circuit 43 which controls the triggering of the TRIAC 36.

An A.C. to D.C. converter 44 is connected to the supply leads 24, 25, and provides a pair of stabilized and balanced voltages $+V_c$ and $-V_c$ and a non-stabilized voltage $V_{cc}$, which are applied to the previously mentioned circuits 29, 32, 34, 40, 42 and 43 as illustrated diagrammatically.

The operation of the control unit 18 will now be described.

When the microswitch 17 is closed by the depression of the lever 8 the pilot circuit 43, triggered by the voltage $V_{cc}$ provided by the converter 44, activates the TRIAC 36 which consequently allows energisation of the electromagnet 15 by rectified current provided by the rectifier bridge 35. The electromagnet 15 upon energisation holds the lever 8 down, maintaining the microswitch 17 closed.

At the same time the ramp generator 40 starts to supply to the second threshold comparator 42 a voltage which increases linearly with time. After a predetermined period of time from the moment of closing of the microswitch 17, the signal provided by the ramp generator 40 reaches a voltage level such as to trip the second threshold comparator 42 causing the second pilot circuit 43 of the TRIAC 36 to be inhibited.

The TRIAC 36 is thus deactivated and the rectifier circuit 35 ceases to supply the electromagnet 15, which, upon becoming de-energised, allows the lever 8 to return to its rest position, with consequent reopening of the microswitch 17 and disconnection from the supply of the electronic control unit 18 and of the heater 13.

Returning now to the initial moment of closure of the microswitch 17, the operation of the remaining part of the electronic control unit 18 will be described with reference to FIG. 6.

The thyristor 28 controlled by the pilot circuit 29, closes, connecting the current supply to the Wheatstone bridge 20 and consequently causing current to be supplied to the heater 13.

The heater 13 in the illustrated example has a nominal power when cold of about 2 Kw and has the thermoelectric characteristics of a positive temperature coefficient of resistance so that the value of its resistivity increases in a very perceptible manner with temperature (5% per degree C.).

The measurement voltage picked up by the regulating circuit 30 across the measuring diagonal of the Wheatstone bridge 20 is therefore indicative of the temperature reached by the resistance of the heater 13. This measurement voltage, amplified by the differential amplifier 32 and integrated by the integrator circuit 33, is fed to the first threshold comparator 34, which ceases to supply the pilot circuit 29 when the voltage at its input exceeds a predetermined threshold value, thus causing open-circuiting of the thyristor 28 and consequent switching off of the current supply to the heater 13.

The current supply to the resistive heater 13 is reinstated automatically every five cycles by cycle control means so that the aforesaid measurement voltage is applied to the input of the regulating circuit 30 periodically indicating the temperature of the resistance of the heater 13.

The control circuit 31 achieves in this way a control of the proportional integrating type on the measurement signal provided by the measuring diagonal of the Wheatstone bridge 20, with alternating switching off and on of the current supply to the heater 13.

In this way the temperature of the resistance heater 13, after an initial transient, becomes established within a sufficiently narrow range and can be regulated by the variable resistance 23. This temperature range localised around 350° C., is sufficient to heat to a temperature of about 50° C. the drink 7 contained in the container 5 in the interval timed by the timer 39—in the case of a normal portion of coffee this interval would be about 45–50 seconds—without damaging either the metal cover 6 or the container 5.

At the end of the interval timed by the timer 39 the second pilot circuit 43 also sends an inhibiting command to the first pilot circuit 29 thus forcing open-circuiting of the thyristor 28 and the disconnection of the Wheatstone bridge 20 and of the heater 13.

It will be understood that practical embodiments of the invention may be widely varied in relation to what has been described and illustrated without nevertheless departing from the scope of this invention.

What is claimed is:

1. A device for heating a liquid in a container of thermoplastics material hermetically sealed by means of a metal cover, the device comprising in combination:
   support means for the container adapted to accommodate the container in an inverted position;
   an electrical resistive heater positioned in relation to the container support means to be in thermal contact substantially with the whole surface of the metal cover of the inverted container during heating of the liquid therein, said heater being of nominal power rating sufficient to heat the liquid in a short time while having the electrothermal characteristics of a positive temperature coefficient of resistance;
   support means for the heater adapted to keep the heater in contact with the cover of the container accommodated in the support means during the period of the heating of the liquid,
   a general switch, and
   an electronic control unit connectable to a power supply through said general switch, the control unit comprising:
   (a) input terminals for connection to a power supply,
   (b) a Wheatstone bridge having four arms a supply diagonal and a measuring diagonal, the supply diagonal being connected to the input terminals, and the resistive heater being included in one arm of said bridge, the measuring diagonal of which provides signal indicative of the temperature reached by the said resistive heater,
   (c) a regulator circuit arranged to regulate the current supply to supply diagonal of said Wheatstone bridge in dependence upon the said signal on the measuring diagonal of the bridge so that, after an initial transient phase, the temperature of the heater remains substantially within a predetermined range for the whole duration of the heating of the liquid, and
   (d) a timer arranged, after a predetermined interval timed from the moment of commencement of the heating, to switch off, by means of the regulator circuit, the current supply to the Wheatstone bridge and to open the general switch, disconnecting the control unit from the power supply.

2. The device defined in claim 1, wherein the regulator circuit comprises:
   first controlled switching means interposed between the supply diagonal of the Wheatstone bridge and one of the input terminals and adapted to switch on or off the power supply to the said bridge,
   a first pilot circuit for generating control signals for closing the said first switching means, and
   a control circuit having an input connected to the measuring diagonal of the Wheatstone bridge, the control circuit controlling the first pilot circuit to enable or inhibit the latter alternately in a succession of phases the duration of which depends, according to a formula of the proportional integral type, upon the value of the said signal present on the measuring diagonal of the Wheatstone bridge, the said first pilot circuit in the inhibition phases controlling the periodic brief closure of the first controlled switching means so as to allow periodic feeding, even during the said inhibition phases, of the supply current to the Wheatstone bridge, so as to maintain the heater partially energised.

3. The device defined in claim 2, wherein the first controlled switching means comprise a thyristor (SCR) and the first pilot circuit comprises a pulse generator incorporating a unijunction transistor (UJT).

4. The device defined in claim 2, wherein the control circuit consists of a differential amplifier for amplifying the signal present on the measuring diagonal of the Wheatstone bridge, an integrator circuit connected to the output of the differential amplifier and a first threshold comparator connected to the output of the integrator circuit and arranged to inhibit the said first pilot circuit when the voltage at the input to said first comparator exceeds a pre-established threshold value.

5. The device defined in claim 1, including an electromagnet cooperating with the general switch, and wherein the timer comprises a ramp generator, a second threshold comparator connected to the ramp generator, and a second pilot circuit connected to the output of the second comparator, said second pilot circuit being adapted to keep the general switch closed for the said predetermined interval by means of the energisation of the said electromagnet resulting from closure of the general switch.

6. The device defined in claim 5, including second controlled switching means controlling the current supply to the said electromagnet, the second pilot circuit, at the end of the said timed interval, de-energising the electromagnet by opening second controlled switching means.

7. The device defined in claim 6, wherein the second controlled switching means comprise a TRIAC.

8. The device defined in claim 1, wherein the general switch is a normally open microswitch so arranged as to be closed by means of downward pressure exerted upon an inverted container accommodated in the support means.

9. The device defined in claim 5, wherein the general switch comprises a normally open microswitch and wherein the container support means are displaceable and, as a result of downward pressure exerted on the inverted container housed in said support means the latter are displaced to position the cover of the container in contact with the heater and at the same time to close the microswitch, said contact being maintained for the whole duration of the heating of the liquid by virtue of the force exerted on the support means by the said electromagnet energised upon closure of the microswitch.

10. The device defined in claim 9, wherein the container support means comprise an elongate lever, fixing means securing one end of the lever cantilever-fashion to the heater support means, a forked support provided on the other end of the lever said forked support being adapted to accommodate the inverted container, said fixing means keeping the forked support in a substantially horizontal position in a rest condition of the device and allowing elastic deflection of the lever so that the said forked support, as a result of said downward pressure on the container, can be depressed so as to bring the cover of the inverted container into contact with the heater; such deflection causing closure of the microswitch, which is disposed below the lever, said microswitch being maintained closed for the entire heating interval by means of the electromagnet acting on the said lever.

11. The device defined in claim 10, wherein the heater support means comprise a support plate and a cup-shaped container the bottom of which is fixed to the support plate, the open upper end of the container being disposed below the said forked support, and elastic means within the cup-shaped container supporting the electrical resistive heater, said support plate being connected to the fixing means of the lever which constitutes the container support means.

12. The device defined in claim 11, wherein said elastic means comprise a number of springs interposed between the bottom of the cup-shaped container and the heater.

13. The device defined in claim 11, wherein the support plate carries a printed circuit which interconnects the electrical components of the electronic control unit.

14. The device defined in claim 1, wherein the electrical resistive heater has a casing in the shape of a plano-convex lens, the convex face of the heater casing being uppermost and constituting a heating surface of the said heater, while the flat face of the casing is connected by the said elastic support means to the bottom of the cup-shaped container, the said heater casing containing a heating element wound spirally on an insulating support and arranged in thermal contact with the said heating surface.

15. The device defined in claim 14, wherein the heating element comprises nickel wire.

* * * * *